United States Patent
Eckert

[19]

[11] Patent Number: 6,099,085

[45] Date of Patent: Aug. 8, 2000

[54] METHOD AND APPARATUS FOR A DECELERATION-REGULATED BRAKING SYSTEM

[75] Inventor: Horst Eckert, Rehburg-Loccum, Germany

[73] Assignee: WABCO GmbH, Hannover, Germany

[21] Appl. No.: 09/098,514

[22] Filed: Jun. 17, 1998

[30] Foreign Application Priority Data

Jun. 20, 1997 [DE] Germany .......................... 197 26 116

[51] Int. Cl.[7] .................................................. B60T 13/74
[52] U.S. Cl. ................................. 303/3; 303/7; 303/15; 303/155; 303/9.69
[58] Field of Search ........................... 303/3, 15, 7, 155, 303/9.69, 174, 166, 191, 198; 701/50, 70, 124

[56] References Cited

U.S. PATENT DOCUMENTS

| | | | |
|---|---|---|---|
| 4,677,557 | 6/1987 | Stumpe | 303/9.69 |
| 4,685,745 | 8/1987 | Reinecke | 303/191 |
| 4,790,606 | 12/1988 | Reinecke | 303/191 |
| 4,795,219 | 1/1989 | Brearley et al. | 303/15 |
| 5,141,292 | 8/1992 | Gardell et al. | 303/9.69 |
| 5,338,106 | 8/1994 | Rothen et al. | 303/9.69 |
| 5,403,073 | 4/1995 | Frank et al. | 303/7 |
| 5,415,466 | 5/1995 | Breen et al. | 303/7 |
| 5,482,359 | 1/1996 | Breen | 303/7 |
| 5,599,072 | 2/1997 | Feldmann | 303/3 |
| 5,632,530 | 5/1997 | Brearley | 303/9.69 |

FOREIGN PATENT DOCUMENTS

| | | |
|---|---|---|
| 40 20 693 A1 | 2/1992 | Germany . |
| 38 29 951 C2 | 8/1992 | Germany . |
| 41 30 018 A1 | 3/1993 | Germany . |
| 41 36 571 C1 | 3/1993 | Germany . |
| 41 42 670 A1 | 6/1993 | Germany . |
| 42 35 364 A1 | 4/1994 | Germany . |
| 43 10 422 A1 | 7/1994 | Germany . |
| 43 26 256 C1 | 12/1994 | Germany . |
| 44 29 231 C1 | 8/1995 | Germany . |
| 44 28 929 A1 | 2/1996 | Germany . |
| 44 42 487 C1 | 3/1996 | Germany . |
| 195 10 934 A1 | 9/1996 | Germany . |
| 195 14 382 A1 | 10/1996 | Germany . |
| 195 15 842 A1 | 10/1996 | Germany . |
| 195 19 768 A1 | 12/1996 | Germany . |
| 44 18 768 C2 | 12/1996 | Germany . |

*Primary Examiner*—Robert J. Oberleitner
*Assistant Examiner*—Thomas J. Williams
*Attorney, Agent, or Firm*—Proskauer Rose LLP

[57] ABSTRACT

A method and apparatus for braking a vehicle ensures the correct braking deceleration for every deceleration demand of the driver, without the need for a load sensor. The load condition of the vehicle is represented by a predetermined linking signal, which is stored in an electronic control system. The control system evaluates the deceleration demand of the driver with respect to the actual braking deceleration, and determines the dimensioning of braking energy as a function of the linking signal and the deceleration demand. An actual-deceleration feedback signal is monitored by the control system, in order to enable it to equalize the deceleration demand and the actual vehicle deceleration.

16 Claims, 1 Drawing Sheet

METHOD AND APPARATUS FOR A DECELERATION-REGULATED BRAKING SYSTEM

FIELD OF THE INVENTION

The present invention relates to a process for the braking of a vehicle. More specifically, the present invention relates to simplifying the attainment of the braking deceleration demanded by the driver of a vehicle, through a deceleration demand signal.

BACKGROUND OF THE INVENTION

A braking system which is operated in accordance with such a process is often called a "deceleration-regulated braking system."

The term "brake" is used herein as a collective term for all components participating in the production of a braking force. This also applies to the terms "front axle brake" and "rear axle brake", as used herein.

A braking system process of the type mentioned above is described as a "simplification" in DE 41 42 670 A1 (U.S. Pat. No. 5,338,106, at column 5, line 58), which are incorporated herein by reference.

This process presupposes the generation of a load signal by means of a load sensor. A load sensor, however, especially in combination with the appertaining installation parts, represents a considerable cost. A load sensor also requires a considerable amount of space, especially in combination with its installation parts. It may also be prone to malfunctions, especially under unfavorable installation and utilization conditions.

It is therefore an object of the present invention to further develop a process of the type referenced above, by simple means and, importantly, without requiring a load sensor.

If a vehicle, for instance, has at least one rear axle brake, in addition to, for instance, a front axle brake, the present invention can distribute the needed braking force among the brakes by assigning brake application energies to the brakes in accordance with predetermined allocation rules.

In this manner, the present invention makes it possible to obtain any desired braking behavior. It is possible, during brake actuation, that the present invention always maintains the brake application energies in a fixed relationship to each other, or that it applies one brake constantly, while it applies the other brake with only certain values of the variable magnitudes of the brake allocation rules. However, the desired braking behavior may consist of a brake application which produces even brake wear (wear-optimized brake application), or of a brake application which avoids the swerving of a vehicle during braking (stability-optimized brake application), or of a combination of these two applications. The previously mentioned process, according to U.S. Pat. No. 5,338,106, provides such a combination. This process applies the brakes in a wear-optimized manner for lower deceleration demand signals, and in a nearly stability-optimized manner for greater deceleration demand signals. The limitation "nearly" is necessary because, as is discussed in detail in U.S. Pat. No. 5,338,106, a combination of wear-optimized and ideal stability-optimized brake applications is not possible.

The present invention can also be developed further to enable adapted utilization of a trailer brake.

The term "braking energy" should not be considered strictly in the physical sense, but as a collective term for all physical phenomena which cause a brake to produce a braking force. Electrical parameters, such as current and voltage, or mechanical parameters, such as pressure, can also be considered as types of braking energy. When pressure is used for braking energy, fluid or gaseous pressure means, e.g., compressed air, are normally used as the braking energy.

SUMMARY OF THE INVENTION

In accordance with an illustrative embodiment of the present invention, a method for the braking of a vehicle with at least one brake which is actuated by braking energy is as follows:

a) storing a predetermined linking signal in a control device, such that the linking signal links a deceleration demand signal with an associated braking force, b) generating a deceleration demand signal by the driver of the vehicle, e.g., by depressing a brake pedal, c) dimensioning an amount of braking energy, as determined by the control device, as a function of both the deceleration demand signal and the predetermined linking signal.

An illustrative embodiment of the present invention is more fully described below in conjunction with the following drawing.

BRIEF DESCRIPTION OF THE DRAWING

A schematic drawing of a braking system is shown in accordance with the present invention.

DETAILED DESCRIPTION OF THE INVENTION

Figure 1:
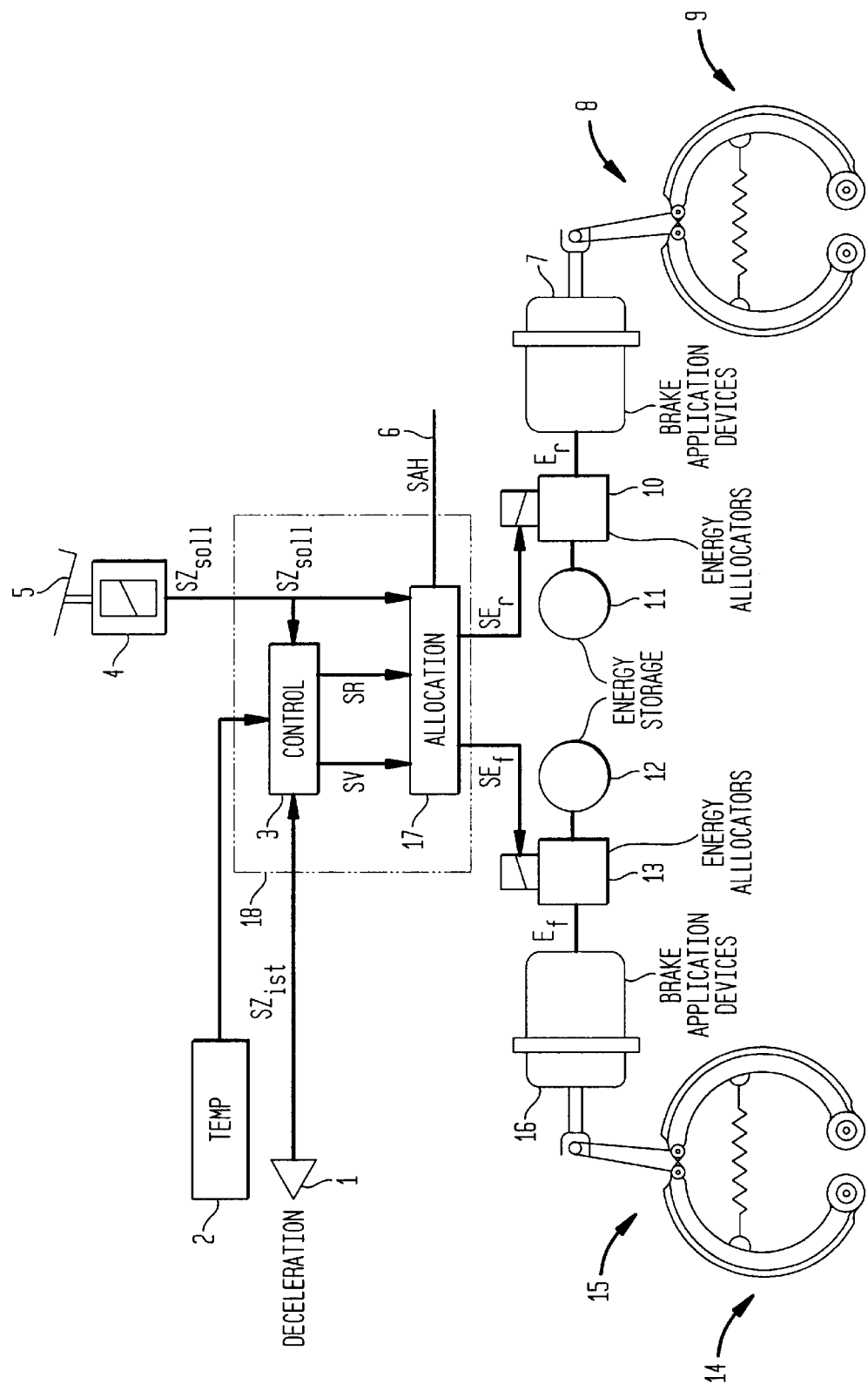

The braking system shown in the drawing contains a front axle brake 15 and a rear axle brake 8, which are actuated by receiving braking energies Ef, Er, respectively. Please note that the full connecting lines represent braking energy lines, and the dot-dash connecting lines represent signal or control lines. The brakes 15, 8 may be the only ones on the respective axle, but may also be representative of various brakes distributed between the vehicle sides on the respective axle, as in the general case. Each brake 15, 8, respectively, consists of a wheel brake 14, 9 producing the braking force, and of a brake application device 16, 7 receiving the braking energy Ef, Er, and transforming the braking energy into an application force for its appertaining wheel brake 14, 9.

The braking system has a braking energy storage device 12, 11 for each brake 15, 8, respectively. These energy storage devices 12, 11 are charged to full energy capacity, and are maintained at that level in a known manner by energy supply devices, which are not shown.

The braking system has an electrical control system for its actuation. Basically, it consists of an electrical braking value transmitter 4, control electronics 3, a deceleration sensor 1, allocation electronics 17, and an electrically controlled energy allocator 13, 10, respectively, for brakes 15, 8. The energy allocators 13, 10 are located, respectively, in the braking energy lines, between their associated brake application device 16, 7 and their associated braking energy storage device 12, 11. Furthermore, depending on the design of the energy allocators 13, 10, energy sensors may be part of the control system, for detecting the appertaining braking energies Ef, Er, and may be integrated into the energy allocators 13, 10. If there are other brakes in addition to brakes 15, 8, an energy allocator can be provided for each such brake, or one common energy allocator can be provided for the brakes of one axle.

All of the components of the braking system described above, with the exception of the electronics 3, 17 are of known design. If for example, the brake system is designed for pressure as the type of braking energy, the energy supply devices consist of a compressor or a pump, as well as of auxiliary devices, such as pressure regulators, filters, safety devices, etc. In this case, the energy storage devices 12, 11 consist of storage containers, the brake application devices 16, 7 consist of brake cylinders, and the energy allocators 13, 10 are electrically controlled valves. Any suitable design can be considered for the deceleration sensor 1. If an anti-lock protection device is part of the brake system, as is typical, the appertaining anti-lock electronics can be used as the deceleration sensor 1. The latter forms a deceleration signal from the rotating behavior of the vehicle wheels, and this signal can be used as the actual-deceleration signal (SZist), which is discussed in greater detail below. This solution can be achieved without any additional devices, and is therefore especially advantageous.

The previously mentioned control electronics 3, 17 can be derived from known designs. They would only need to be programmed in a manner familiar to a person skilled in the art, with regard to the functions described below.

The output of the braking value transmitter 4 is connected to an input of control electronics 3 and, in parallel, to an input of allocation electronics 17. An additional input of control electronics 3 is connected to deceleration sensor 1. The output of control electronics 3 is connected to an additional input of allocation electronics 17. Outputs of allocation electronics 17 are connected to the control units of energy allocators 13, 10.

In order to clearly show the connections mentioned, control electronics 3, 17 are shown as separate components. In actual brake systems, however, control electronics 3, 17 are often integrated into each other, wholly or in part, as indicated by the broken surrounding line 18. Also, a partial or complete integration of control electronics 3, 17 with the anti-lock electronics is well known in the art.

The operating principles of the inventive brake system can be described most clearly with an example of a system with one brake, or with several brakes on one axle. Therefore, for the functional descriptions which follow, it is assumed that only one of the brakes, e.g., front axle brake 15, is present.

In the following description, the term "braking force" is used to represent the braking force between tires and road surface.

A linking signal (SV) is stored in control electronics 3. Its value is predetermined by control electronics 3, by updating an initial value entered during the manufacture of control electronics 3, and/or of the vehicle, in preceding brake actuations.

Dimensioning rules for a front axle braking energy signal (SEf) are stored in allocation electronics 17.

To actuate the brake system the driver acts upon an actuation element 5, which is indicated as a pedal on brake value transmitter 4. The latter then outputs a deceleration demand signal (SZsoll) to control electronics 3 and to allocation electronics 17, the value of which depends on the force exerted by the driver upon actuation element 5, and/or on its actuation travel.

The driver thus demands a braking deceleration Zsoll with the deceleration demand signal (SZoll).

Control electronics 3 transmits linking signal (SV) to allocation electronics 17, upon receiving deceleration demand signal (SZsoll).

Upon receiving both deceleration demand signal (SZsoll) and linking signal (SV), allocation electronics 17 calculates the front axle braking energy signal (SEf), in accordance with signals (SZsoll) and (SV), and the stored dimensioning rules. Allocation electronics 17 then transmits signal (SEf) to the control unit of the appertaining energy allocator 13. Energy allocator 13 then transmits brake application energy Ef from the appertaining braking energy storage device 12 to the brake application device 16 of front axle brake 15, as a function of the value of the front axle brake application energy signal (SEf). The wheel brake 14 of brake application device 16 then produces a braking force Bf, corresponding to the front axle braking energy Ef. This braking force Bf causes a braking deceleration Zist of the vehicle.

Deceleration sensor 1 monitors the braking deceleration Zist, and transmits a corresponding actual-deceleration signal (SZist) to control electronics 3.

Control electronics 3 compares actual-deceleration signal (SZist), at predetermined time intervals, to deceleration demand signal (SZsoll). If actual-deceleration signal (SZist) does not deviate from deceleration demand signal (SZsoll), actual deceleration (Zist) is equal to the demanded braking deceleration (Zsoll).

According to Newton's basic dynamic law, the front axle braking force Bf required to produce the demanded braking deceleration amounts to:

$$Bf = m*Zsoll \tag{I}$$

where m is the vehicle mass.

Equation (I) states the generally known fact that, for a given deceleration demand Zsoll, the braking force Bf required for same depends on the vehicle mass m.

The following relationship exists between Zsoll and the corresponding deceleration demand signal (SZsoll):

$$Zsoll = U*SZsoll \tag{II}$$

where U is a conversion factor. Therefore, Equation (I) can be rewritten in the following form:

$$Bf = m*U*SZsoll \tag{III}$$

On the other hand, the following formula also applies for the front axle braking force:

$$Bf = Rf*(Ef - Ef0) \tag{IV}$$

where Rf is the wheel braking factor, which indicates how much braking force per unit of braking energy is produced by front axle brake 15, and where Ef0 is the response energy at which front axle brake 15 begins to produce a braking force.

Between (Ef−Ef0) and the corresponding front axle braking energy signal (SEf−SEf0), the following relationship exists:

$$Ef - Ef0 = K*(SEf - SEf0) \tag{V}$$

where K is a conversion factor.
The following equation can then be derived from (III), (IV) and (V):

$$SEf - SEf0 = m*(U/K*Rf)*SZsoll \tag{VI}$$

Up to this point, a vehicle may have had mass m1, and a linking signal (SV) stored in control electronics 3 may have had the value (SV1).

Let us now assume that the vehicle mass is increased from m1 to m2 through additional loading.

During the initial braking after additional loading, the braking system works as described above, i.e., control electronics 3 transmits the previously applicable linking signal (SV1) to allocation electronics 17, so that front axle brake 15 produces the corresponding braking force. However, this braking force is not sufficient to produce the demanded braking deceleration Zsoll, in view of the increased vehicle mass m2. Therefore, control electronics 3 will determine a deviation between the actual-deceleration signal (SZist), as received from deceleration sensor 1, and the deceleration demand signal (SZsoll). Thereupon, control electronics 3 will increase the value of linking signal (SV) from time interval to time interval in steps, from (SV1) to (SV2), such that the front axle braking force Bf produces a braking deceleration Zist, whose appertaining actual-deceleration signal (Szist) no longer deviates from the deceleration demand signal (SZsoll). If the driver terminates brake actuation before this, control electronics 3 continues the step-by-step increase of linking signal (SV) during the next brake actuation, using the last value reached as the starting value.

In a manner analogous to the above, control electronics 3 will decrease the value of linking signal (SV) in steps, in the event of a decrease in vehicle loading, as a result of a decrease in vehicle mass m.

The linking signal (SV) thus changes in the same sense as the vehicle mass. Equation (VI) can therefore be replaced by the following relationship:

$$SEf-SEf0=(SV)*(M*U/K*Rf)*SZsoll \qquad (VIIa)$$

which can also be written in the following form:

$$SEf=SV*(M*U/K*Rf)*SZsoll+SEf0 \qquad (VIIb)$$

where M is a coefficient which defines the applicable relationship between vehicle mass m and linking signal (SV).

In this relationship, therefore, linking signal (SV) links deceleration demand signal (SZsoll) with the appertaining front-axle braking energy signal (SEf), and thereby also with the appertaining braking force Bf. Thus, linking signal (SV) assumes the role of the load signal in the prior art, and thereby renders the prior art load sensor unnecessary.

In effect, relationship VIIa or VIIb reproduces, at least the last steps, of the dimensioning rules stored in allocation electronics 17.

In another embodiment, control electronics 3 does not modify linking signal (SV) while receiving a deceleration demand signal (SZsoll), i.e., during a brake actuation, but does so only when the deceleration demand signal (SZsoll) ends, i.e., at the end of a brake application.

In this embodiment, control electronics 3 modifies an auxiliary signal (SR) in steps at said predetermined time intervals, during a brake actuation, in the case of a deviation of the actual-deceleration signal (SZist) from deceleration demand signal (SZsoll), until the deviation disappears. Control electronics 3 transmits auxiliary signal (SR) to allocation electronics 17 at another output. The latter is designed in this case in such manner, that while it receives a deceleration demand signal (SZsoll), i.e., during a brake actuation, it will insert the product (SZsoll*SR), from the multiplication of the deceleration demand signal (SZsoll) with the auxiliary signal (SR), into the dimensioning rule, according to relationship VIIa or VIIb. Upon completion of the brake actuation, control electronics 3 then updates linking signal (SV), in accordance with the last value or another value, i.e., a mean value, of the auxiliary signal (SR).

As a rule, control electronics 3 is designed so that it recognizes a deviation of the actual-deceleration signal (SZist) from deceleration demand signal (SZsoll) only when it has reached or exceeded a predetermined tolerance range. The tolerance range may be necessary because of unavoidable instrument variations, and also to compensate for minor dynamic processes during brake actuation.

At the start of a brake actuation, the vehicle is often subject to a starting deceleration or acceleration, which is to be regarded as a negative starting deceleration. Such a starting deceleration may be due to another braking device (e.g., a wearless permanent brake, such as an engine brake, or retarder), and/or travel resistances, and/or a rising or dropping roadway. Such a starting deceleration may have consequences for the brake system or the driver, as described in detail in DE 41 31 169 A1 (U.S. Pat. No. 5,599,072), which are incorporated herein by reference. If such consequences are to be avoided, the basic design of the brake system as described above can be developed further. In this further development, control electronics 3 stores the existing actual-deceleration signal as a starting deceleration signal (SZist0), upon receiving the deceleration demand signal (SZsoll). Control electronics 3 then forms a difference between the received momentary actual-deceleration signal (SZistM) and the starting deceleration signal (SZist0) at every time interval, and uses this difference (SZistM−SZist0) as the actual deceleration signal (SZist) for comparison with the deceleration demand signal (SZsoll).

It may occur that the front axle brake 15 approaches its load limit and, depending on the brake design, the front axle braking force Bf drops as a consequence. Due to this braking force drop, the braking deceleration Zist and the actual-deceleration signal (SZist) also drop, so that a deviation of the latter from the deceleration demand signal (SZsoll) occurs. Control electronics 3 reacts to this deviation in the same manner as for an increase of the vehicle mass m, i.e., depending on the design, with an increase in linking signal (SV), or of auxiliary signal (SR). Allocation electronics 17 thereupon increases the front axle braking energy signal (SEf) such that the original braking force Bf is restored. In this case, however, the front axle brake 15, which is nearing its load limit, may be subjected to additional load and risk.

This behavior can be avoided by a further development of control electronics 3, or of allocation electronics 17. In this further development, when front axle brake 15 approaches its load limit, either control electronics 3 does not increase the linking signal (SV) or the auxiliary signal (SR), or allocation electronics 17 does not increase the front axle braking energy signal (SEf), while the deceleration demand signal (SZsoll) remains unchanged. As a result of this further development, the driver senses a fading of the brake action when the front axle brake 15 approaches its load limit, so that he is able to adjust his driving operations accordingly.

In another embodiment, determining that the load limit is being reached will trigger a reduced adaptation of linking signal (SV), or of auxiliary signal (SR), as a function of the load.

The information that the front axle brake 15 is approaching its load limit can be transmitted to control electronics 3, or to allocation electronics 17, in various ways. One possibility is to provide one or several temperature sensors on the front axle brake 15, in particular at its wheel brake 14, which are connected to inputs of control electronics 3, or allocation electronics 17, and transmit either continuous temperature signals or limit temperature signals. Control electronics 3 or allocation electronics 17 are designed in such manner in this case that, when receiving a temperature limit signal while deceleration demand signal (SZsoll) remains unchanged, they maintain the value of auxiliary signal (SR), or front axle braking energy signal (SEf) constant, for as long as the temperature limit signal appears, or as long as the brake actuation lasts.

In the drawing, a temperature sensor 2, which is assigned to front axle brake 15, and connected to an input of control electronics 3, is shown as an example.

Other possibilities for determining that the front axle brake 15 is approaching its load limit consist of storing algorithms for a mathematical heat rise model or a mathematical load cumulation model in control electronics 3, and/or in allocation electronics 17, so that the control system may determine the load condition of the front axle brake on the basis of material characteristics, such as heat capacity, as well as from braking energies, wheel speeds, actuating times, cooling times, etc.

Let it now be assumed that the vehicle is equipped as a tractor for coupling with a trailer, and that the latter has a trailer braking system, which is controlled in the usual manner by a trailer control signal (SAH), produced in the tractor.

The manner in which the trailer control signal (SAH) is produced depends on the design of the trailer braking system.

There are trailer braking systems with autonomous load-dependent braking force regulation. These braking systems cause a predetermined trailer braking deceleration, or a trailer braking deceleration within a predetermined bandwidth, to be associated with every value of trailer control signal (SAH) for every load condition of the trailer. Such a trailer braking system, and the braking system of the tractor, are well coordinated with each other in respect to the directional stability of the vehicle train, which consists of the tractor and the trailer, in the case of a brake actuation, if the same, or similar, association applies to the trailer control signal (SAH) and the tractor braking deceleration.

Such a coordination of the braking systems is prescribed, for example, by "Guidelines of the European Community" (EC Guidelines), which is statutory to many European countries for certain vehicle classes in the form of compatibility bands.

In the case of this type of trailer braking system, the deceleration demand signal (SZsoll) can in principle also be used as a trailer control signal (SAH), if the relationship between the deceleration demand signal (SZsoll) and the tractor braking deceleration is precisely equal to the relationship between the trailer control signal (SAH) and the trailer braking deceleration. As a rule, however, the trailer control signal (SAH) must be formed by conversion and processing from the deceleration demand signal (SZsoll), and this is done in the allocation electronics 17.

Allocation electronics 17 ensures the conversion and processing of the deceleration demand signal (SZsoll) into the trailer control signal (SAH), based on stored algorithms and, as required, based on stored influence values. Allocation electronics 17 then transmits the trailer control signal (SAH) to a trailer control line 6. As a rule, trailer control signal (SAH) will then have a certain relationship with the deceleration demand signal (SZsoll). In addition, allocation electronics 17 can be designed so that it can also take into account the vehicle mass m, in the form of linking signal (SV), when trailer control signal (SAH) is determined. Thereby, the control system enables a position of the relationship between the vehicle braking deceleration and the trailer control signal (SAH), coordinated with the vehicle mass m, within the above-mentioned predetermined bandwidth.

Certain other trailer braking systems do not have autonomous load-dependent braking force regulation. Such installations assign a certain braking force to each trailer control signal (SAH), and as a result, different trailer braking decelerations result, for different trailer masses, for a given trailer control signal (SAH). Good coordination between such a trailer braking system and the braking system of the tractor is not possible when a trailer control signal (SAH) is formed in the manner described above.

One possibility of coordinating such a trailer braking system with the braking system of the tractor is offered by a coupling force regulation, such as is described, e.g., in DE 42 43 245 A1 (U.S. Pat. No. 5,403,073), which are incorporated herein by reference. This system adjusts the coupling force between the tractor and the trailer to zero, or to a desired value, by means of the trailer control signal. A coupling force regulation requires force sensing and additional regulating devices, and is therefore expensive. The inventive braking system avoids this expense, and still affords well-coordinated co-actuation of the trailer braking system.

In the case of a trailer braking system without load-dependent braking force regulation, allocation electronics 17, upon receiving a deceleration demand signal (SZsoll), dimensions the trailer control signal (SAH) according to the product of the linking signal (SV) multiplied by the deceleration command signal (SZsoll), as (SV*SZsoll). In an embodiment in which the auxiliary signal (SR) is changed, rather than the linking signal (SV), in the tractor during a brake actuation, allocation electronics 17 dimensions the trailer control signal (SAH), upon receiving a deceleration command signal (SZsoll), according to the product of the linking signal (SV) multiplied by the auxiliary signal (SR) multiplied by the deceleration demand signal (SZsoll), as (SV*SR*SZsoll). As mentioned above, linking signal (SV) is to be regarded as a load signal. In this case, the trailer control signal (SAH), which is transmitted by allocation electronics 17 to trailer control line 6, can therefore be regarded as a load-dependent modified deceleration demand signal (SZsoll). Therefore, in the case of such a trailer braking system, the inventive braking system outputs a load-dependent adjusted trailer control signal (SAH), and thus shifts the load-dependent braking force regulation of the trailer braking system into the dimensioning of the trailer control signal (SAH), and thereby into the braking system of the tractor.

For the purpose of further adaptation of this obtainable coordination, an influence factor can be entered into the allocation electronics 17, and can be taken into account by the latter in the determination of the trailer control signal (SAH). This influence factor expresses different configurations of the tractor brake(s) and of the brakes of the trailer braking system.

If additional trailers are part of the train formed by the tractor and the trailer, and if these additional trailers are equipped with a trailer braking system, controlled by a trailer control signal produced in the tractor, the trailer control signal (SAH), formed in the manners described above, can also be used for co-actuation of the trailer braking systems of the additional trailers.

Let it be assumed now that the rear axle brake 8 is also present, in addition to front axle brake 15. In this case, allocation rules are stored in the allocation electronics 17, according to which the allocation electronics 17 forms the front axle braking energy signal (SEf) and a rear axle braking energy signal (SEr), and thereby allocates the braking energies (Ef, Er) to the brakes 15, 8, respectively. In this manner, the total braking force (B=Bf+Br) required for the generation of the demanded braking deceleration Zsoll, in accordance with Equation (I), is allocated to front axle brake 15 and rear axle brake 8.

Various influence factors, such as, e.g., the fixed values of the previously mentioned wheel brake factor (Rf) of front axle brake 15, and of rear axle brake (Rr), which are stored in allocation electronics 17, or are to be inputted to same, may be taken into account in the allocation rules, depending on the desired braking behavior.

The allocation rules can be stored in allocation electronics 17 in the form of algorithms, for example, leading to target value characteristics Ef, Er=f (SZsoll, SV). These correspond to the characteristics (target value) obtained with the simplification described in U.S. Pat. No. 5,338,106 (starting at column 5, line 58), and which are composed for every load condition of the vehicle, i.e., for every value of linking signal (SV), of a wear-optimized and a nearly stability-optimized characteristic line branch. In this case, influence factors stored in allocation electronics 17, in addition to the wheel brake factors (Rf, Rr), are the generally reproducible interrelationships mentioned in U.S. Pat. No. 5,338,106 with linking signal (SV), instead of the load signal.

If control electronics 3 changes linking signal (SV) or auxiliary signal (SR) during a brake actuation, allocation electronics 17 re-calculates the brake application signals (SEf), (SEr), during the current brake actuation, based on the changed linking or auxiliary signal (SV), (SR), according to the allocation rules. In the case of a change in linking signal (SV), allocation electronics (17) adapts the braking force distribution among the axles immediately, in such manner that the obtained brake behavior is maintained.

The previous discussions concerning the determination of trailer control signal (SAH) remain unchanged by the addition of rear axle brake 8.

The previous discussion concerning front axle brake 15 approaching its load limit also applies to rear axle brake 8, and also correspondingly, to the brakes of the trailer braking systems. Even if only one brake approaches its load limit, this usually results in a drop of the overall braking force, depending on the brake design, and this drop may cause linking signal (SV), or auxiliary signal (SR), or brake application energy signals (SEf), (SEr), but in any case, trailer control signal (SAH), to be maintained at a constant level.

In the case of multiple brakes, as discussed above, it should also be pointed out that in the prior art braking systems, the brake(s) approaching their load limit are not only stressed and endangered even more by the restoration of the overall braking force, but also, only normally charged brake(s) can be pushed to their load limit.

The above described embodiments of the invention are intended to be illustrative only. Numerous alternative embodiments may be devised by those skilled in the art without departing from the spirit and scope of the following claims.

What is claimed is:

1. An apparatus for braking a vehicle having a mass, comprising:
    a) a driver-controlled braking value transmitter, for generating a deceleration demand signal,
    b) a control system, for receiving said deceleration demand signal, said control system having a predetermined linking signal stored therein, said predetermined linking signal representing the vehicle mass,
    c) at least one energy storage device, for storing braking energy,
    d) at least one energy allocator device, for receiving a braking signal from said control system, and for transmitting a dimensioned amount of said braking energy stored in said energy storage device,
    e) at least one brake application device, for receiving said dimensioned amount of said braking energy from said energy allocator device,
    f) at least one brake, for outputting a braking force corresponding to said dimensioned braking energy,
    g) a deceleration sensor, for monitoring an actual deceleration of said vehicle, and for feeding back an actual-deceleration signal to said control system; wherein during a brake application, said control system compares said actual-deceleration signal with said deceleration demand signal, and, based on a function of said linking signal and said deceleration demand signal, outputs a dimensioned signal to said energy allocator, such that said actual-deceleration signal is brought into equality with said deceleration demand signal,
    h) wherein said vehicle is a tractor, equipped for coupling with at least one trailer, said trailer having a trailer braking system controlled by a trailer control signal, which is generated by said tractor, wherein said trailer control signal is dimensioned according to the product of said linking signal and said deceleration demand signal.

2. The apparatus of claim 1, wherein said apparatus comprises at least one front axle brake and at least one rear axle brake, and wherein said front and rear axle brakes are allocated braking energies, in accordance with predetermined allocation rules.

3. A method for the braking of a vehicle with at least one brake which is actuated by braking energy, comprising the steps of:
    a) storing a predetermined linking signal in a control device;
    b) generating a deceleration demand signal by a driver of the vehicle;
    c) transmitting braking energy to said at least one brake thereby causing production of a braking force and an actual braking deceleration of the vehicle;
    d) producing an actual-deceleration signal representing the actual braking deceleration; and
    e) dimensioning the braking energy as a function of the deceleration demand signal and the linking signal such that the actual-deceleration signal is brought into equality with the deceleration demand signal,
    f) the linking signal representing a mathematical coefficient linking the deceleration demand signal and the braking force which is associated with the actual-deceleration signal brought into equality with the deceleration demand signal, the linking signal thereby representing an actual total vehicle mass,
    g) wherein during a braking application, if the actual-deceleration signal, representing the actual deceleration of said vehicle, deviates from said deceleration demand signal, and auxiliary signal is modified and said linking signal is updated only at the end of said brake application.

4. The method of claim 3, wherein when said at least one brake approaches a load limit of said brake, said auxiliary signal is maintained at a constant level.

5. The method of claim 4, wherein a load condition of said at least one brake is monitored by measuring the temperature of at least one brake component per brake.

6. The method of claim 4, wherein a load condition of said at least one brake is monitored by means of a mathematical heat rise model of at least one brake component per brake.

7. The method of claim 4, wherein a load condition of said at least one brake is monitored by means of a mathematical load cumulation model of at least one brake component per brake.

8. The method of claim 3, wherein said at least one brake is a front axle brake, and said braking energy is a front axle braking energy, and said vehicle is furthermore provided with at least one rear axle brake, which is actuated by a rear axle braking energy, and wherein said front and rear axle brakes are allocated corresponding said braking energies, in accordance with predetermined allocation rules.

9. The method of claim 8, wherein said linking signal and said deceleration demand signal are used as variables of said allocation rules.

10. The method of claim 3, wherein said vehicle is a tractor, equipped for coupling with at least one trailer, said trailer having a trailer braking system controlled by a trailer control signal, which is generated by said tractor, wherein said trailer control signal is allocated according to the value of said deceleration demand signal.

11. A method for the braking of a vehicle with at least one brake which is actuated by braking energy, comprising the steps of:
   a) storing a predetermined linking signal in a control device;
   b) generating a deceleration demand signal by a driver of the vehicle;
   c) transmitting braking energy to said at least one brake thereby causing production of a braking force and an actual braking deceleration of the vehicle;
   d) producing an actual-deceleration signal representing the actual braking deceleration; and
   e) dimensioning the braking energy as a function of the deceleration demand signal and the linking signal such that the actual-deceleration signal is brought into equality with the deceleration demand signal,
   f) the linking signal representing a mathematical coefficient linking the deceleration demand signal and the braking force which is associated with the actual-deceleration signal brought into equality with the deceleration demand signal, the linking signal thereby representing an actual total vehicle mass,
   g) wherein said linking signal is modified during a brake application, if the actual-deceleration signal representing the actual deceleration of said vehicle, deviates from said deceleration demand signal, and
   h) wherein when said at least one brake approaches a load limit of said brake, said linking signal is maintained at a constant level.

12. The method of claim 11, wherein a load condition of said at least one brake is monitored by measuring the temperature of at least one brake component per brake.

13. The method of claim 11, wherein a load condition of said at least one brake is monitored by means of a mathematical heat rise model of at least one brake component per brake.

14. The method of claim 11, wherein a load condition of said at least one brake is monitored by means of a mathematical load cumulation model of at least one brake component per brake.

15. A method for the braking of a vehicle with at least one brake which is actuated by braking energy, comprising the steps of:
   a) storing a predetermined linking signal in a control device;
   b) generating a deceleration demand signal by a driver of the vehicle;
   c) transmitting braking energy to said at least one brake thereby causing production of a braking force and an actual braking deceleration of the vehicle;
   d) producing an actual-deceleration signal representing the actual braking deceleration; and
   e) dimensioning the braking energy as a function of the deceleration demand signal and the linking signal such that the actual-deceleration signal is brought into equality with the deceleration demand signal,
   f) the linking signal representing a mathematical coefficient linking the deceleration demand signal and the braking force which is associated with the actual deceleration signal brought into equality with the deceleration demand signal, the linking signal thereby representing an actual total vehicle mass,
   g) wherein said linking signal is modified during a brake application, if the actual-deceleration signal, representing the actual deceleration of said vehicle, deviates from said deceleration demand signal, and
   h) wherein a difference between a momentary actual-deceleration signal and a starting deceleration signal is used as the actual-deceleration signal.

16. A method for the braking of a vehicle with at least one brake which is actuated by braking energy, comprising the steps of:
   a) storing a predetermined linking signal in a control device;
   b) generating a deceleration demand signal by a driver of the vehicle;
   c) transmitting braking energy to said at least one brake thereby causing production of a braking force and an actual braking deceleration of the vehicle;
   d) producing an actual-deceleration signal representing the actual braking deceleration; and
   e) dimensioning the braking energy as a function of the deceleration demand signal and the linking signal such that the actual-deceleration signal is brought into equality with the deceleration demand signal,
   f) the linking signal representing a mathematical coefficient linking the deceleration demand signal and the braking force which is associated with the actual-deceleration signal brought into equality with the deceleration demand signal, the linking signal thereby representing an actual total vehicle mass,
   g) wherein said vehicle is a tractor, equipped for coupling with a least one trailer, said trailer having a trailer braking system controlled by a trailer control signal, which is generated by said tractor, wherein said trailer control signal is allocated according to the product of said linking signal and said deceleration demand signal.

* * * * *